Figures 1, 2:
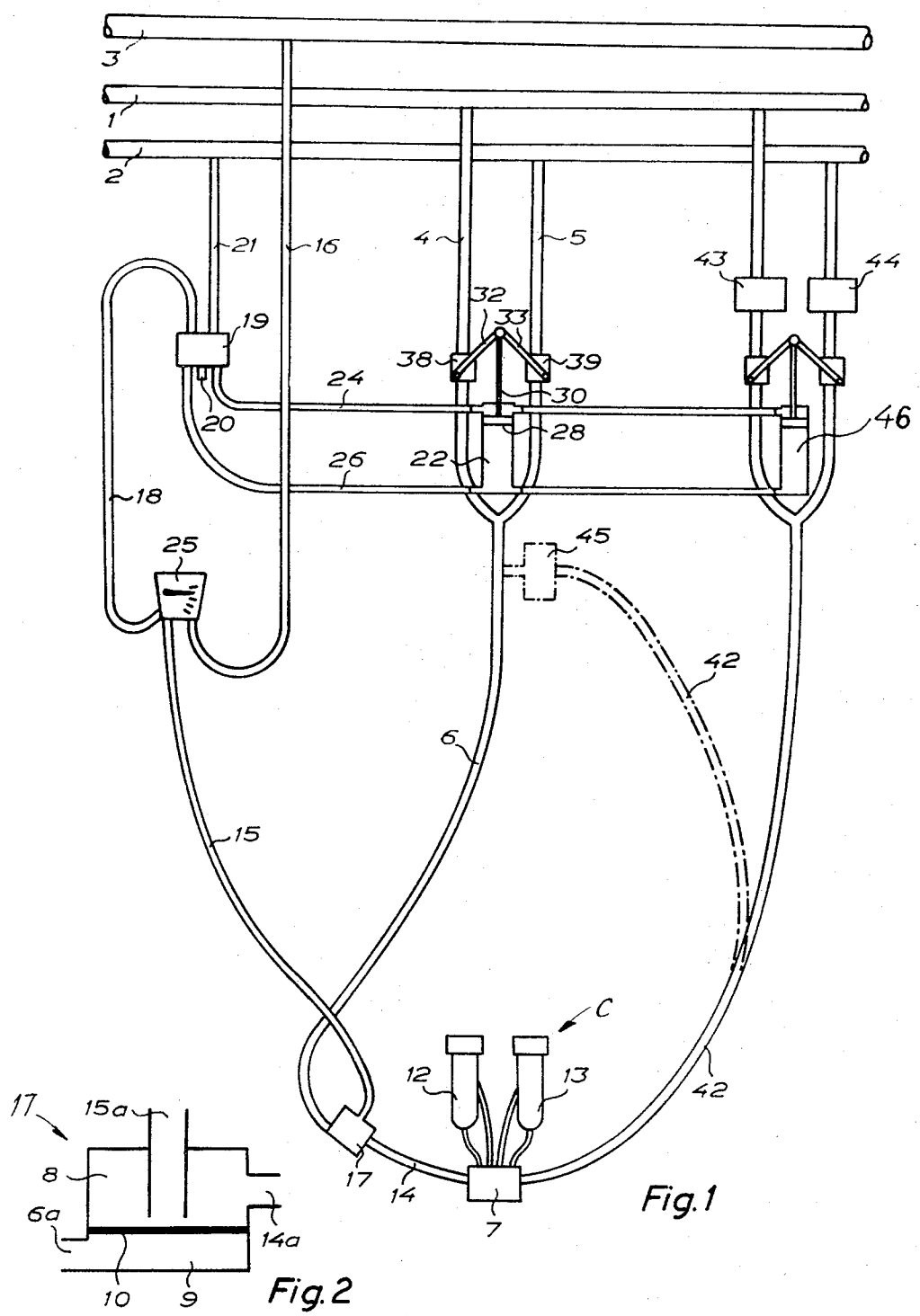

United States Patent [19]
Olander

[11] 3,783,837
[45] Jan. 8, 1974

[54] MILKING MACHINE
[75] Inventor: Karl Erik Olander, Sodertalje, Sweden
[73] Assignee: Alfa-Laval AB, Tumba, Sweden
[22] Filed: July 14, 1971
[21] Appl. No.: 162,448

[30] Foreign Application Priority Data
Feb. 16, 1971  Belgium .................................. 99814

[52] U.S. Cl. ........................... 119/14.08, 119/14.14
[51] Int. Cl. ............................................. A01j 05/04
[58] Field of Search ...................... 119/14.08, 14.14, 119/14.41, 14.44

[56] References Cited
UNITED STATES PATENTS
1,533,187  4/1925  Hapgood ...................... 119/14.44 X
3,377,992  4/1968  Baum .............................. 119/14.08
3,482,593  12/1969  Heimann et al. ............. 119/14.44 X

FOREIGN PATENTS OR APPLICATIONS
326,064  7/1970  Sweden ............................ 119/14.08

Primary Examiner—Hugh R. Chamblee
Attorney—Davis, Hoxie, Faithfull & Hapgood

[57] ABSTRACT

A duct under partial vacuum leads milk from the teat cup cluster and creates a milking milk therein, the duct having a regulating valve operable to vary the milking vacuum. A device for sensing changes in the rate of milk flow through this duct is connected to control means for operating the regulating valve to decrease the milking vacuum from a working value to an idling value in response to a decrease in the milk flow rate and in increase the milking vacuum from an idling to a working value in response to an increase in said rate.

4 Claims, 4 Drawing Figures

INVENTOR.
KARL ERIK OLANDER

INVENTOR.
KARL ERIK OLANDER

MILKING MACHINE

The present invention relates to a milking machine comprising a teat cup cluster, a duct under partial vacuum for leading the milk from the teat cup cluster, a device for sensing changes in the milk flow rate, and control means operable by the sensing device. The arrangement is in particular characterized by a regulating valve controlled by the control means for regulating the milking vacuum in the teat cup cluster between an idling value and one or more working values in response to changes in the rate of milk flow from the cluster, the regulating valve being connected in the duct which is under partial vacuum.

A milking machine having means for regulating the vacuum conditions in the teat cup cluster between an idling value and one or more working values in response to changes in the rate of flow of the milk during the milking operation is described in a pending patent application of Bengt Troberg and Carl Claesson, which is a continuation-in-part of their application Ser. No. 878,294 filed Nov. 20, 1969. In an embodiment of that machine, the arrangements for the regulation of the magnitude of the milking vacuum comprises a vessel for receiving the milk, a flow rate indicator in a duct leading from the teat cup cluster to the receiving vessel and means arranged to vary the vacuum in the receiving vessel in response to impulses transmitted by the flow rate indicator.

The arrangement according to the present invention is an improvement of the above-mentioned arrangement for the regulation of the magnitude of the milking vacuum. It is less bulky and easier to handle, but above all it eliminates a risk that has proved to be inherent in the arrangements described in said prior patent application. It has been found that the latter, if utilized in connection with pipe line milkers, may subject the teats of the cow to a very high milking vacuum, which is particularly the case when the teats should preferably be subjected to only a comparatively low idling vacuum. The reason for this is that in modern plants there is frequently an even considerably higher vacuum in the milk-transport-pipe leading from the said receiving vessel to the end unit of the plant than the ordinary comparatively strong milking vacuum, and under unfavorable conditions an uncontrolled communication might arise between the transport pipe and the teat cup cluster.

Figure 3:
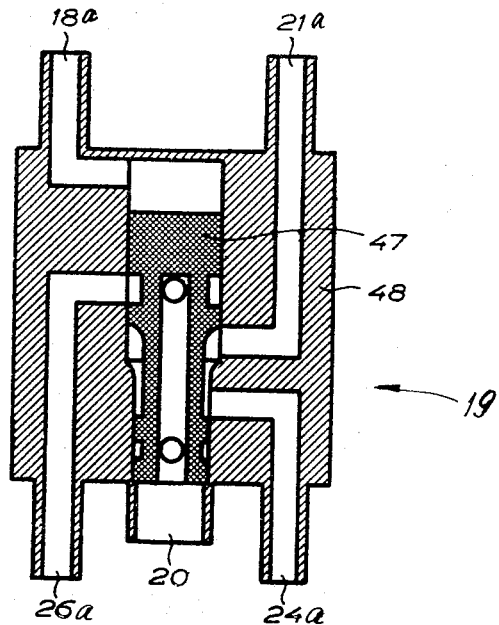
Figure 4:
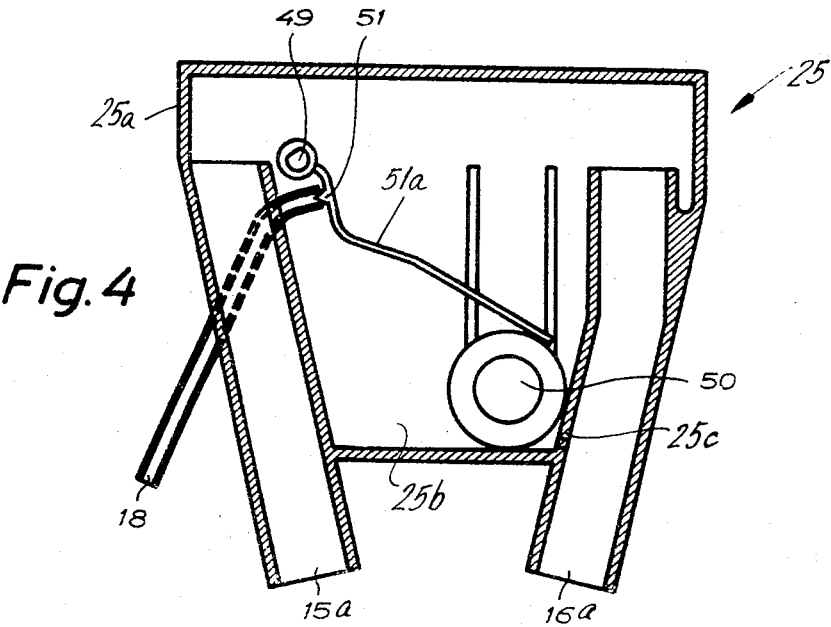

The invention will be described in more detail below with reference to the drawings, in which FIG. 1 is a schematic view of a pipe line milker incorporating one embodiment of the invention;

FIG. 2 is a schematic sectional view of an enlarged scale of one form of the regulating valve shown in FIG. 1; and FIGS. 3 and 4 are sectional views of examples of the changer and the milk flow rate indicator, respectively, which are shown in FIG. 1 for controlling the regulating valve.

Referring to FIG. 1, the vacuum conduit 1 is for a comparatively high vacuum, e.g., 550 mm Hg., and the vacuum conduit 2 is for a comparatively low vacuum, e.g., 250 mm Hg. The higher vacuum (the working vacuum) is intended to be utilized when the milk flow is comparatively strong, whereas the lower vacuum (the idling vacuum) is intended to be utilized when the milk flow is weak or has ceased, i.e., when the milking mcahine is idling. A conventional teat cup cluster C includes a claw 7 through which milk is led to a hose 14 from the milk tubes of the teat cups, two of which are shown at 12 and 13, the teat cups being pulsed pneumatically through the usual pulsation tubes communicating with a hose 42. The latter is arranged to be connected to one of the pulsators 43, 44 and 45 with different pulsation vacua and different pulsation characteristics, as has been described in the aforementioned pending patent application. The teat cup cluster is also connected to a milk transport pipe line 3 by means of a duct including hoses 14, 15 and 16, which thus lead the milk from the teat cup cluster to the transport pipe. There is a vacuum regulating valve 17 interconnecting the parts 14 and 15 of the latter duct, and this valve is controlled by being connected to either vacuum conduit 1 or to vacuum conduit 2 through a rubber tube 6 and one of two rubber tubes 4 and 5.

As shown in FIG. 2, the housing of valve 17 is divided into two chambers 8 and 9 by means of a membrane 10. Depending upon the pressure conditions in chambers 8 and 9, the membrane 10 may bulge toward or away from the inlet end of the pipe 15a facing the membrane. The valve is connected whereby hose 15 is drawn onto pipe 15a, hose 14 is drawn onto nipple 14a, and rubber tube 6 is drawn onto nipple 6a.

Also connected in the duct 14-15-16 is a flow rate indicator 25 which serves as a device for sensing changes in the rate of milk flow. This device is arranged to transmit pneumatic inpulses to a changer 19 by means of a duct 18. The changer 19 functions in response to impulses from the milk flow rate indicator 25 to connect the upper or lower end of a pneumatic cylinder 22 via tubes 24 and 26 and tube 21 to the vacuum conduit 2.

Referring to the flow rate indicator 24 as shown in FIG. 4, the interior of its housing 25a is closed except for an inlet passage 15a and an outlet passage 16a for connection to the hoses 15 and 16, respectively. Below the upper ends of these passages and communicating therewith is a chamber 25b containing a float 50 and having adjacent its bottom a discharge hole leading to outlet passage 16a. With a relatively small inflow rate of the milk (or no inflow), the float seats on the chamber bottom due to the discharge through hole 25c. A float-follower lever 51a is connected to a spindle 49 which carries a pointer outside the housing (FIG. 1), and in this seated position of the float a valve 51 on lever 51a closes the duct 18 at its end located in the indicator housing. However, when the milk inflow rate is substantial or normal, so that float 50 is raised sufficiently to cause valve 51 to open the opposing end of duct 18, the latter connects changer 19 to the vacuum in housing 25a and hoses 15-16. Thus, the flow indicator 25 transmits pneumatic signals through duct 18 to changer 29, whereby the latter will be subjected to this vacuum during a relatively high flow rate (normal milking) but otherwise will be disconnected from this vacuum.

The changer 19, as shown in FIG. 3, comprises a housing 48 with an axially movable piston valve 47. The housing forms passages 18a, 21a, 24a and 26a for connection to tubes or ducts 18, 21, 24 and 26, respectively. When no milk flows from the udder of the cow (i.e., when valve means 51 of the flow rate indicator has closes the orifice of duct 18), the vacuum in duct 16 will not influence piston valve 47, and it will take its lower position as shown in FIG. 3. There will then be a vacuum connection from tube 21 to tube 24 and the upper part of the pneumatic cylinder 22, and air from inlet 20 will be admitted through tube 26 into the lower part of cylinder 22. The piston 28 will therefore take the position shown in FIG. 1. When milk starts to flow normally, float 50 will rise and open the orifice of duct 18. There will then be a vacuum connection from duct 16 to the changer 19. The piston valve 47 will therefore rise to an upper position, and there will be a vacuum connection to the lower part of the pneumatic cylinder 22 via tubes 21 and 26, and a connection for the atmosphere to the upper part of cylinder 22 via inlet opening 20 and tube 24. Obviously, piston 28 will thus be pressed down to the bottom of cylinder 22.

In the operation of the illustrated arrangement, when the teat cups 12 and 13 of the cluster have been attached to the udder of the cow but before the flow of milk has yet started, the vacuum connection to the changer 19 via duct 18 is broken. The vacuum conduit 2 for the idling vacuum (the lower vacuum) is then connected via rubber tubes 5 and 6 to chamber 9 of the regulating valve 17, since the piston of the pneumatic cylinder 22 controlling the hose pincher means 38 and 29 will have a corresponding position. In this position, the hose pincher means 39 on rubber tube 5 from vacuum conduit 2 is open, whereas rubber tube 4 from vacuum conduit 1 is closed by the hose pincher means 38. Obviously, the membrane 10 of the regulating valve 17, due to the generally high vacuum prevailing in the milk transport line 3 and in chamber 8 of the regulating valve 17, will then be pressed in the direction toward the orifice of pipe 15a. A decreased and corresponding low vacuum value in chamber 8 and inside the liners in the teat cups 12 and 13 is thus obtained. Consequently, the teats are now subjected to the idling vacuum and a gentle treatment.

When the normal flow of milk starts, the orifice of duct 18 in the milk flow rate indicator 25 is opened. The changer 19 is therefore acted upon by the vacuum in the transport pipe line via tubes 16 and 18 in such a direction that the piston 28 in the pneumatic cylinder 22 is moved from its earlier position to the reversed position. The hose pincher means 39 is thus closed whereas hose pincher means 38 is opened, with the result that the vacuum pipe 1 for the higher vacuum (the working vacuum) is connected through tube 4 to chamber 9 of the regulating valve 17. The membrane 10 will now be moved in the direction away from the orifice of pipe 15a. A correspondingly higher working vacuum will thus be created, via hose 14, in the liners in teat cups 12 and 13. Consequently, the teats will now be subjected to a comparatively strong working vacuum.

When the milk flow near the end of the milking operation decreases below a certain value or completely ceases, the idling vacuum of pipe 2 will again be created in the liners in teat cups 12 and 13 by means of the arrangement previously described.

The new arrangement thus accomplishes the objective of subjecting the teats of the cow to a more gentle treatment by changing the vacuum conditions in the teat cups between an idling value, which should be applied when no milk or only a small quantity of milk is flowing from the teats, and one or more working values which should be applied when the flow of milk is of a normal magnitude.

It has been proved that the teats are particularly sensitive to mechanical treatment when no milk is flowing, and injuries are caused if the vacuum conditions are not regulated according to the magnitude of the milk flow. It will be understood that even when applying the system to a pipe line milker with a strong transport vacuum in the pipe line, the vacuum cnditions of the teat cups will always be kept under control, and a vacuum of suitable magnitude will be created in the teat cup liners in dependence on the rate of the milk flow.

Preferably, the control means of the arrangement according to the invention are also arranged to vary the magnitude of the massage (pulsating) vacuum in the teat cups between an idling value and one or more working values in dependence upon changes of the rate of flow of the milk.

Preferably, the control means are also arranged to control the massaging frequency and the relation between the length of the pressure and suction periods of the massage function of the teat cups in dependence upon changes of the milk flow rate.

The preferred controlling of the massage vacuum, the massaging frequency and the relation between the pressure and the suction periods is obtained by connecting the vacuum conduits 1 and 2 with their different vacua and their respective pulsators 43 and 44, by means of the pneumatic cylinder 46, alternately to the teat cup cluster C by way of hose 42. The pneumatic cylinder 46 is caused to function the same way as the pneumatic cylinder 22 by the changer 19 in response to impulses from the flow rate indicator 25. Pulsators 43 and 44 have different pulsating characteristics. Pulsator 45 has characteristics of its own, and it might alternatively be connected instead by means of pneumatic cylinder 22.

The hose pinchers 38 and 39 are shown schematically as being operated from piston 28 through linkage 30, 32 and 33. Such linkage and pinchers are not shown in their details because they are within the skill of the art. Moreover, the pinchers could be replaced by valves located in the tubes 4 and 5 and operated in a conventional manner by piston 28, whereby the latter in its upper position opens tube 5 and closes tube 4, and in its lower position closes tube 5 and opens tube 4.

I claim:

1. In a milking machine, the combination of a teat cup cluster, a duct under partial vacuum connected to said cluster for leading milk therefrom and for creating a milking vacuum in the cluster, a device for sensing changes in the rate of milk flow through said duct, a regulating valve connected in said duct and operable to vary said milking vacuum, and control means operatively connected to the regulating valve and sensing device for operating said valve to decrease said milking vacuum from a working value to an idling value in response to a decrease in said flow rate and to increase the milking vacuum from an idling value to a working value in response to an increase in said flow rate.

2. The combination defined in claim 1, in which said regulating valve includes a housing and a movable member dividing the housing into two chambers, one of said chambers interconnecting different parts of said duct, the other chamber having a pneumatic connection to said control means, said member being movable by the control means through said pneumatic connection to effect said decrease and increase of the milking vacuum.

3. The combination defined in claim 1, in which said control means includes a pneumatic tube connected to the regulating valve, and valve means operable by said sensing device for varying the pressure in said tube.

4. The combination defined in claim 1, in which said control means include a pneumatic tube connected to the regulating valve, and valve means operable by said sensing device for varying the pressure in said tube, said regulating valve including a housing and a movable member dividing the housing into two chambers, one of said chambers interconnecting different parts of said duct, the other chamber communicating with said pneumatic tube, said member being movable in response to pressure changes in said tube to effect said decrease and increase of the milking vacuum.

* * * * *